United States Patent Office 3,294,833
Patented Dec. 27, 1966

3,294,833
MANUFACTURING ESTERS OF 1-ALKOXYCYCLO-PROPANECARBOXYLIC ACIDS
Lee V. Phillips, Overland Park, Kans., assignor, by mesne assignments, to Gulf Oil Corporation, Pittsburgh, Pa., a corporation of Pennsylvania
No Drawing. Filed May 8, 1963, Ser. No. 278,983
2 Claims. (Cl. 260—468)

This invention relates to manufacture of esters of 1-substituted cyclopropanecarboxylic acids, in particular by a ring closure technique.

Esters of 1-substituted cyclopropanecarboxylic acids are useful, particularly for conversion into amides having good herbicidal activity. The 1-alkyl substituted esters may be made readily by alkylation of the ester or the corresponding nitrile. However, if it is desired to make the 1-alkoxycyclopropanecarboxylate esters, this method is not available, and any method employed must take into consideration the reactivity of the alkoxy group in the product.

I have discovered that the 1-substituted esters, including the 1-alkoxy esters may be made readily by a procedure which is simple and which gives good yields of product.

Briefly, I have found that esters of 1-substituted cyclopropanecarboxylic acids may be made by reacting an ester of 4-chloro-2-substituted butyric acid with sodamide at an elevated temperature in the presence of an inert solvent. The reaction may be represented as follows:

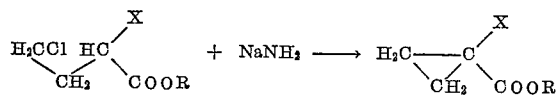

The use of an inert solvent reaction medium is recommended, in particular because of the inconvenience involved in handling sodamide in the absence of a solvent. The common hydrocarbon solvents such as benzene, toluene, xylene and petroleum distillates are suitable. An elevated temperature may be maintained conveniently by refluxing the inert solvent.

Unsaturated by-products are normally formed during the reaction according to the present invention. If no recovery of these by-products is contemplated, they may conveniently be brominated and the desired ester of 1-substituted cyclopropanecarboxylic acid may then be recovered from the reaction mixture by distillation. Other methods of separation may be employed, particularly if recovery of by-products in unchanged form is desired.

The following example is presented by way of illustration and not limitation, so that those skilled in the art may readily understand the method of the present invention.

Example

A mixture of 34.8 g. (0.21 mol) of methyl 4-chloro-2-methoxy-butyrate, 150 ml. of benzene and sodamide freshly prepared from 5.3 g. (0.23 g. atom) of sodium was refluxed for 36 hours. Sufficient water was then added to the reaction mixture, after cooling, to dissolve the water-soluble constituents of the mixture. The organic phase was separated, dried and filtered. So as to effect removal of unsaturated by-products, the filtrate was reacted with small portions of bromine dissolved in chloroform until reaction ceased, as indicated by failure to cause disappearance of the bromine color. After removal of benzene by distillation at atmospheric pressure, the residue was distilled to yield 12 g. of colorless liquid product, methyl 1-methoxycyclopropanecarboxylate, B.P. 77–80° C. at 43 mm. Hg pressure; $n_D^{18}$ 1.4294.

The above example is believed to exemplify sufficiently the method of this invention. The method is applicable to synthesis of a variety of esters of 1-substituted cyclopropanecarboxylic acids. Since it is only the terminal chlorine and alpha hydrogen of the substituted butyric ester which are involved, the 2-substituent on the butyric acid and the alkyl group of the ester derived from an alcohol do not have a critical effect. Obviously, the 2-substituent should be chosen so as to be non-reactive with sodamide, unless simultaneous reaction at this position is desired. For instance, a chloroalkyl substituent might in this way be converted to an aminoalkyl substituent. Many other modifications and variations may be made without departing from the spirit and scope of the invention, as will be apparent to those who are skilled in the art.

What is claimed is:
1. The method of manufacturing an ester of a 1-alkoxycyclopropanecarboxylic acid comprising reacting an ester of 2-alkoxy-4-chlorobutyric acid with sodamide at an elevated temperature in the presence of an inert solvent and recovering the ester of 1-alkoxycyclopropanecarboxylic acid from the resulting reaction mixture.

2. The method of manufacturing methyl 1-methoxycyclopropanecarboxylate comprising reacting methyl 4-chloro-2-methoxybutyrate with sodamide in an inert solvent at elevated temperature and recovering methyl 1-methoxycyclopropanecarboxylate from the resulting reaction mixture.

References Cited by the Examiner
UNITED STATES PATENTS

| | | | |
|---|---|---|---|
| 2,992,269 | 7/1961 | Harrom et al. | 260—468 |
| 3,077,496 | 2/1963 | Julia | 260—468 |
| 3,201,466 | 8/1965 | Dubrovin | 260—468 |

LORRAINE A. WEINBERGER, Primary Examiner.
RICHARD K. JACKSON, Examiner.